United States Patent [19]
Ash, II

[11] 3,766,861
[45] Oct. 23, 1973

[54] SYSTEM FOR HANDLING AND CONVEYING RELATIVELY LARGE WORKPIECES OR OTHER OBJECTS

[75] Inventor: John L. Ash, II, Pittsford, N.Y.

[73] Assignee: The Gleason Works, Rochester, N.Y.

[22] Filed: Oct. 4, 1971

[21] Appl. No.: 185,977

[52] U.S. Cl. .................................. 104/91, 104/124
[51] Int. Cl. ............................................. B61b 3/00
[58] Field of Search ...................... 214/658; 212/10, 212/11, 18, 71; 104/89, 91, 93, 96, 97, 98, 106, 107, 110, 118, 120, 121, 137; 105/141, 144, 145, 148, 150

[56] References Cited
UNITED STATES PATENTS

| 2,972,403 | 2/1961 | Barton | 104/93 |
|---|---|---|---|
| 2,903,972 | 9/1959 | Schutze | 104/118 |
| 2,718,321 | 9/1955 | Westermeyer | 214/658 |
| 2,780,229 | 2/1957 | Davis | 104/93 |
| 1,047,252 | 12/1912 | Lawson | 214/62 A |
| 945,750 | 1/1910 | Butler | 105/154 |
| 2,945,608 | 7/1960 | Beler | 214/658 |

Primary Examiner—Gerald M. Forlenza
Assistant Examiner—D. W. Keen
Attorney—Morton A. Polster

[57] ABSTRACT

A system for loading and unloading workpieces to and from gear cutting machines includes an overhead handling and conveying system capable of carrying relatively heavy loads along a longitudinal axis of movement and having means for guiding the loads to adjusted positions perpendicular to the longitudinal axis of movement. The overhead conveyor system includes a fixed overhead rail means for carrying the load of a carriage frame means suspended therefrom with a retained workpiece or other object. In addition, there is a guide track means suspended from said overhead rail, and the guide track can be adjusted in directions generally perpendicular to the main longitudinal axis of the overhead rail. The system provides for a transverse shifting of relatively heavy loads suspended from the overhead rail without any requirement for an adjustment in position of the load-carrying overhead rail itself.

10 Claims, 13 Drawing Figures

SYSTEM FOR HANDLING AND CONVEYING RELATIVELY LARGE WORKPIECES OR OTHER OBJECTS

BACKGROUND AND BRIEF DESCRIPTION OF INVENTION

The present invention is concerned with improvements in systems for handling relatively large objects which must be loaded and unloaded to and from a series of stations spaced apart from one another. More specifically, the invention is concerned with an overhead conveying system which is especially useful for handling workpieces being loaded to and from gear cutting machinery.

In the art of cutting relatively large ring gear pieces, it has been the practice to manually load and unload gear cutting machines capable of cutting spiral bevel gear teeth in work-blanks having relatively large diameter bores. Typically, a work-blank is manually loaded (often with the assistance of hand-operated chain falls) and oriented on a first gear cutting machine capable of cutting rough tooth formations in the blank. After rough cutting, the blank is manually unloaded from the machine and placed on a second gear cutting machine for a finish cutting operation. For cutting relatively large gear pieces, on the order of 150 lbs. or more in weight, there are prior art gear cutting machines of a known design having workholders which can be pivoted to horizontal planes to facilitate the loading and unloading of such large workpieces. During cutting operations, the workholders are pivoted upwardly from the horizontal planes to angular positions at which the workpieces make contact with rotating cutter heads carried by the machines.

As is known in the art, when loading large gears for rough cutting operations on such machines it is generally necessary to angularly position a gear blank on a workholder such as to align a driving key or pin on the workholder with a key slot or hole in the gear. Further, for the subsequent finish cutting on another machine, it is necessary to angularly position the gear blank such as to align the roughed tooth slots for proper engagement by the finishing cutter.

The present invention provides an automated system for loading and unloading relatively large workpieces to and from gear cutting machines, eliminating the need for manual handling of such workpieces. In the context of this specification, the term "workpiece" is intended as a generic term to include uncut blanks, rough cut gear pieces and finished cut gear pieces of the type which would be typically handled and treated by rougher and finisher machines which cut relatively large spiral bevel ring gears. However, the concepts of the present invention can be applied to other work handling and treating applications where it is desirable to move objects from point to point along a generally longitudinal axis of movement, even though the invention will be described with particular reference to a preferred embodiment in which the system is designed to handle and convey workpieces to and from a pair of gear cutting machines. The pair of gear cutting machines constitute, in the example of the invention, a first gear cutting machine functioning as a rougher (for cutting rough tooth configurations in a work blank) and a second gear cutting machine functioning as a finisher (for cutting final profiles on the tooth formations of a previously rough cut workpiece).

In accordance with the present invention, a system is provided for lowering and lifting workpieces to and from gear cutting machines which are typically arranged in pairs, as just described, and which require successive movements of workpieces from a supply stack to an angular orienting station, and thence to each of the pair of gear cutting machines, and finally to an unloading stack. Further, the invention provides for an adjustment of the handling and conveying system to accommodate the handling of varying sizes of workpieces to be loaded and unloaded relative to such gear cutting machines. The gear cutting machines which have been described are capable of cutting varying diameters of gear blanks, but is is necessary to adjust the relative placement of a workpiece on the workholder of a machine whenever a change is made in the size of workpiece being cut. This means that any automatic loading and unloading equipment must include a capability of depositing workpieces at a range of positions on gear cutting machines of this type in order to fully satisfy typical working requirements. The present invention provides for this capability with a novel overhead conveying system which permits lateral or transverse adjustment of position of an object without a requirement for any adjustment of the main load bearing part of the system.

In its broadest application, the present invention provides for a handling and conveying system which includes an overhead rail means for supporting a suspended carriage frame means which transmits the entire load of a workpiece or other object to the overhead rail means. The overhead rail means is fixed in its position so that it can be constructed as a stable structure which will handle relatively heavy loads along a longitudinal path of travel. A guide track means is suspended from the overhead rail means for adjusting the longitudinal path of travel of a workpiece in a direction which is generally perpendicular to the main longitudinal axis of the overhead rail means. Adjusting means are provided for shifting the guide track means perpendicularly to the main axis of the overhead rail means to set the actual path of travel that will be followed by the workpiece. In addition, there is provided a holding means for gripping and retaining the workpiece while it is being moved or handled, and the holding means is supported from the carriage frame means so that all of its load is transmitted back to the carriage frame means and to the overhead rail means. The holding means engages the guide track means so as to be guided to whatever adjusted position is set in the guide track means relative to the overhead rail.

In a more specific application, the present invention provides for a system for loading and unloading relatively large workpieces to first and second gear cutting machines which function to respectively rough-cut and finish-cut the workpieces. An overhead handling and conveying system includes two pickup mechanisms spaced a fixed distance apart for depositing and receiving workpieces on and from the first and second gear cutting machines. A series of stations are arranged in line beneath the overhead handling and conveying system so that the workpieces can be transferred from station-to-station to complete a cutting operation. The pickup mechanisms are operated in a program of movements to deliver and transfer the workpieces to each station for successive treatments and handling. The two pickup mechanisms are suspended within a single carriage frame means which, in turn, suspends all of its load from a fixed overhead rail means. However, as noted above, in order to handle and load gears of different diameters, it is necessary to be able to vary the center of the gears relative to the machines, and therefore lateral adjustment of the line of travel of each pickup mechanism is provided by an adjustable guide track means suspended beneath the fixed overhead rail means so as to guide the pickup mechanisms within the carriage frame means in movements perpendicular, in a horizontal plane, to the main line of travel defined by the overhead rail means.

These and other features and advantages of the present invention will become more apparent in the detailed discussion which follows. In that discussion, reference will be made to the accompanying drawings as briefly described below.

DETAILED DESCRIPTION OF INVENTION

Figure 1:
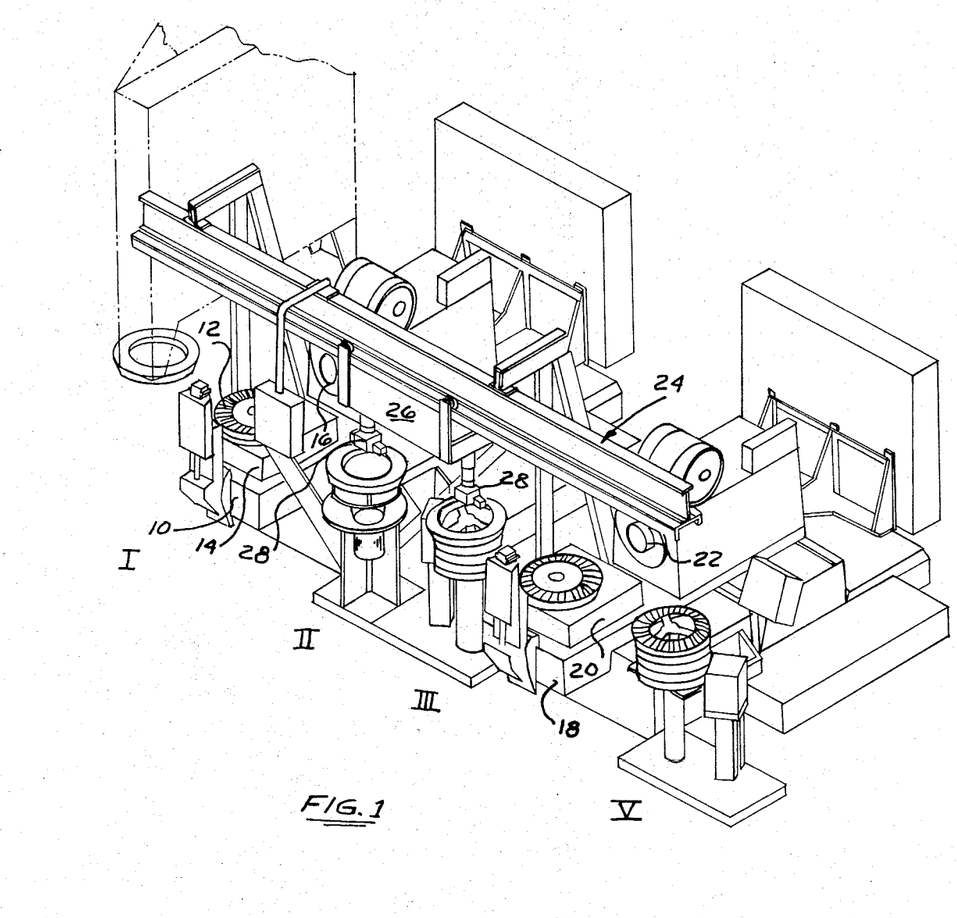
FIG. 1 is a perspective view of a typical plant installation of the system of the present invention as used in combination with a pair of gear cutting machines.
Figure 2:
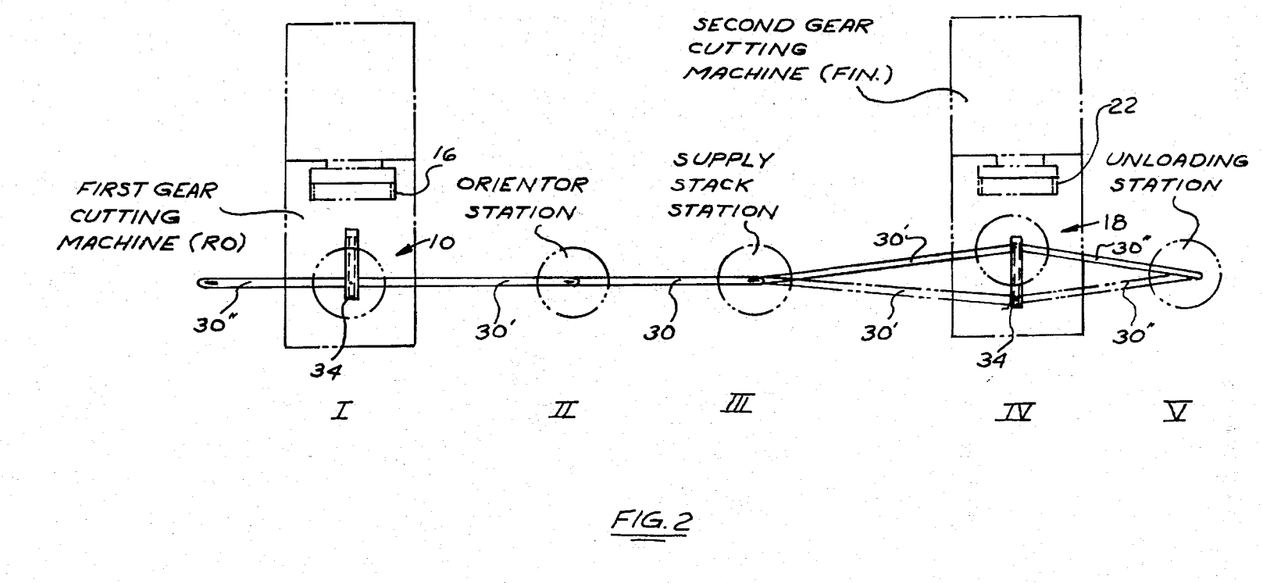
FIG. 2 is a schematic, top plan view of the plant installation of FIG. 1, showing a series of stations to which workpieces must be moved in succession.
Figure 2A:
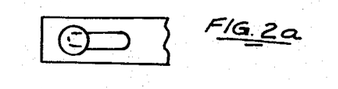
FIGS. 2a and 2b are enlarged fragmentary plan and side elevation views of the end portion of one adjustable guide rail, showing the structure and fastening arrangement used to support the left and right extremities of the guide rail.
Figure 2B:
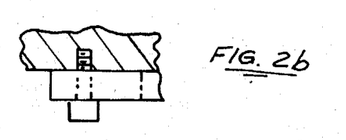
Figure 2C:
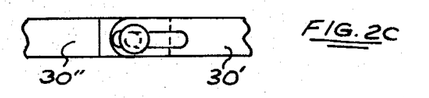
FIGS. 2c and 2d are enlarged fragmentary plan and side elevation views of the end portions of two connecting guide rails, showing the structure and fastening arrangement of the rails at stations II and III as designated in FIGS. 1 and 2.
Figure 2D:
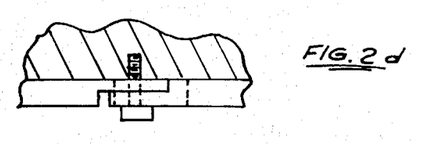

FIGS. 1 and 2 illustrate the system of this invention as used in connection with loading and unloading workpieces to and from a pair of gear cutting machines capable of cutting gear teeth in relatively large and heavey workblanks. The gear cutting machines themselves are known in this art and are more fully described in U. S. Pat. No. 3,269,270. Each machine is of a type which provides for a placement of its workholder in a generally horizontal plane (as shown in FIG. 1) for ease of loading and unloading relatively large workpieces to and from the workholder. A first gear cutting machine 10 functions as a rougher machine for receiving a blank workpiece 12 on its horizontally disposed workholder table 14 which is subsequently pivoted upwardly to a position where the blank workpiece 12 can contact a rotating cutter head 16 for forming tooth configurations in the blank. A second gear cutting machine 18 likewise receives a workpiece, one that has been previously rough cut on the machine 10, on its horizontally disposed work table 20 which is subsequently moved upwardly into cutting engagement with a rotating cutter head 22. The first and second gear cutting machines just described constitute a pair of machines to be serviced by the overhead handling and conveying system of the present invention.

As shown in the FIG. 1 view, the two gear cutting machines 10 and 18, together with a number of additional work stations which will be descried in greater detail hereinafter, are arranged to receive and transfer workpieces along a generally longitudinal path which is beneath and substantially parallel to a longitudinal axis of a fixed overhead rail means 24. The relatively heavy loads of the large workpieces and is secured to fixed structures to establish a stable, load-bearing rail means from which a carriage frame 26 and a pair of pickup mechanisms (or holding means for the workpieces) 28 can be suspended for travel along a longitudinal path defined by the main axis of the rail means 24. Movement of the carriage frame means 26 and its associated pickup mechanisms can be effected manually or by rack 25 and pinion 27, the rack attached to the rail means 24, and the pinion and its driving motor 29 mounted in the movable carriage frame means 26. Motor control means and hydraulic-mechanical stop means of conventional design (not shown) serve to control motion of the carriage frame means (including acceleration and deceleration) along the overhead rail means 24 so as to position the pickup mechanisms 28 over selected work stations.

FIG. 2 schematically illustrates a series of work stations which are set up in a typical installation for automatically handling and conveying gear workpieces to and from first and second gear cutting machines. Station I constitutes a first gear cutting machine functioning as a rougher which receives a blank workpiece for a cutting operation. Station II is an orientor station which includes a mechanism for placing a blank workpiece in correct orientation for being received on a torque pin of the work holder assembly of the first gear cutting machine. The orientor station will be described in greater detail with reference to FIG. 6 below. Station III constitutes a supply stack of blank workpieces for being received, one at a time, by a pickup mechanism 28 for subsequent orientation and placement on the first gear cutting machine. The supply stack comprises a plurality of blank workpieces stacked on top of each other on a device which maintains the uppermost workpiece at a given level for being received and retained by a pickup mechanism 28. Station IV comprises a second gear cutting machine for finish cutting of a gear piece previously cut on the first gear cutting machine. Station V constitutes an unloading station for receiving deposited workpieces removed from the second gear cutting machine. The unloading station is of a type which receives a plurality of workpieces, one on top of the other, in a stack which maintains the level of the uppermost piece at a desired position for receiving an additional workpiece deposited by a pickup mechanism of the system.

With the arrangement shown in FIGS. 1 and 2, the system can be operated through a program of movement which efficiently moves a workpiece to each of the stations at which it is to be deposited. A typical program of movements would be as follows:

a. The carriage frame means 26 moves to the left to place the pickup mechanisms over stations I and II.

b. Both pickup heads are lowered and brought into engagement with workpieces positioned at stations I and II.

c. Both pickup heads are lifted, thereby lifting up a rough-cut gear from station I and an oriented blank from station II.

d. The carriage frame means 26 moves further to the left so as to place the oriented blank over staion I, while the previously rought-cut gear is held in a suspended condition.

e. Only the righthand pickup mechanism is lowered and opened to deposit the oriented blank on the first gear cutting machine at station I.

f. The pickup mechanism over station I is lifted in an empty condition.

g. Carriage frame means 26 moves to the right so as to position the two pickup mechanisms over stations II and III, to allow the gear cutting machines to operate.

h. The workholder assembly of the first gear cutting machine 10 swings to a gear cutting position and cuttin begins on the blank deposited on that machine.

i. Cutting is stopped on the second gear cutting machine and its workholder assembly swings down to a horizontal plane for being unloaded and re-loaded.

j. Carriage frame means 26 moves to the right so as to position the pickup mechanism over stations III and IV (with the lefthand mechanism retaining a previously rough cut workpiece and with the righthand mechanism being empty).

k. The righthand pickup mechanism lowers and engages the finished workpiece carried on the second gear cutting machine at station IV.

l. The righthand pickup mechanism lifts the finished workpiece away from the second gear cutting machine.

m. The carriage frame means moves further to the right so as to position the pickup mechanism over stations IV and V.

n. Both pickup mechanisms lower and deposit their loads, thereby placing a previously rough-cut gear on the second gear cutting machine and placing a finish-cut gear on the unloading station stack.

o. Both pickup mechanisms lift in empty conditions.

p. The carriage frame means moves to the left to place the pickup mechanisms over stations III and IV.

q. The lefthand pickup mechanism lowers and engages a blank from the supply stack at station III.

r. The lefthand mechanism lifts the blank away from the supply stack.

s. The carriage frame means mvoes to the left to stations II and III so that cuttign operations can continue.

t. Workholder assembly of the second gear cutting machine swings upwardly to start a cutting operation.

u. Lefthand pickup mechanism is lowered to deposit its blank onto orientor station II.

v. The orientor is operated to rotate the blank to a desired orientation as the lefthand pickup mechanism lifts in an empty condition.

For the sake of clarity, the above description refers to independent raising and lowering of right and lefthand pickup mechanisms. However, in the preferred embodiment, controls are simplified by raising and lowering both members of the pair of pickup mechanisms simultaneously, even though no function may be required by one member of the pair.

Figure 3:
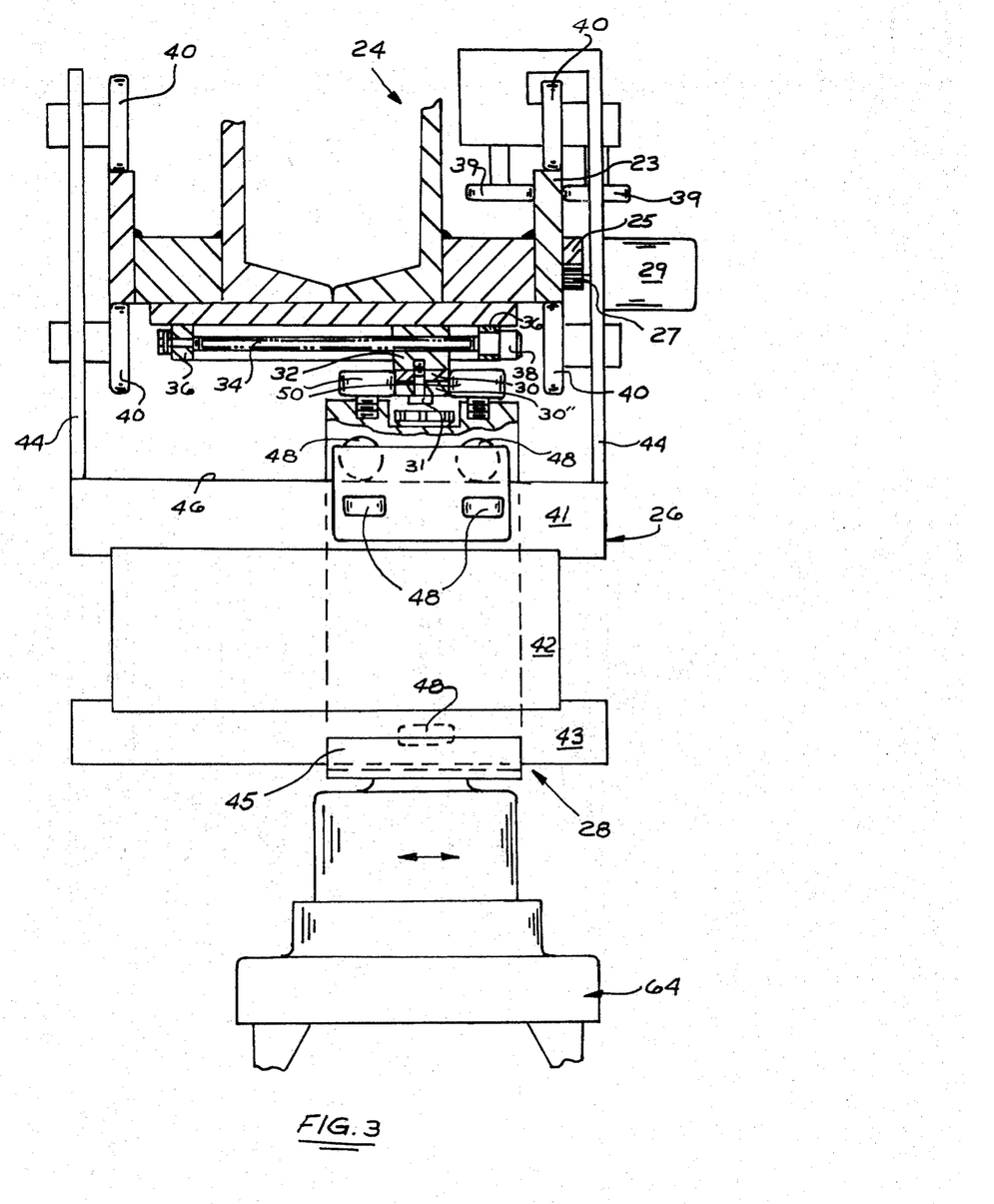
FIG. 3 is an end elevational view, partly in section, showing features of an overhead handling and conveying system of this invention, as the structures would be seen looking along the longitudinal axis of the system.
Figure 4:
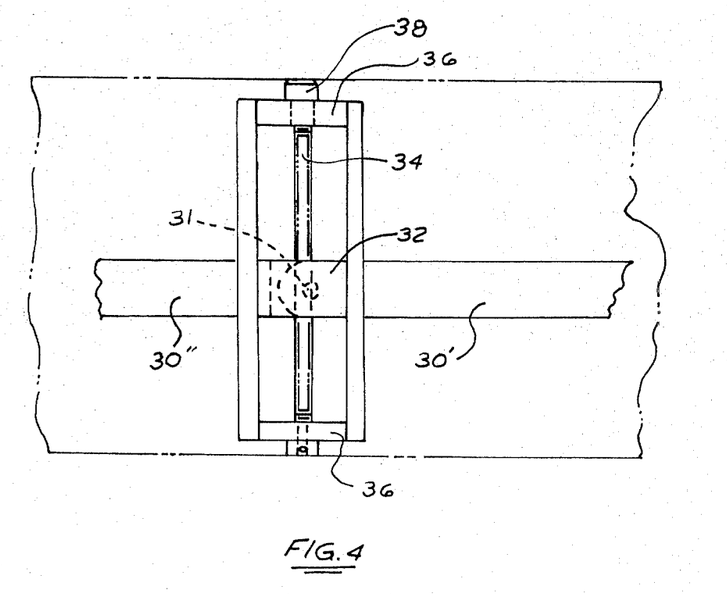
FIG. 4 is a top plan view of an adjusting means used in conjunction with the handling and conveying system.
Figure 5:
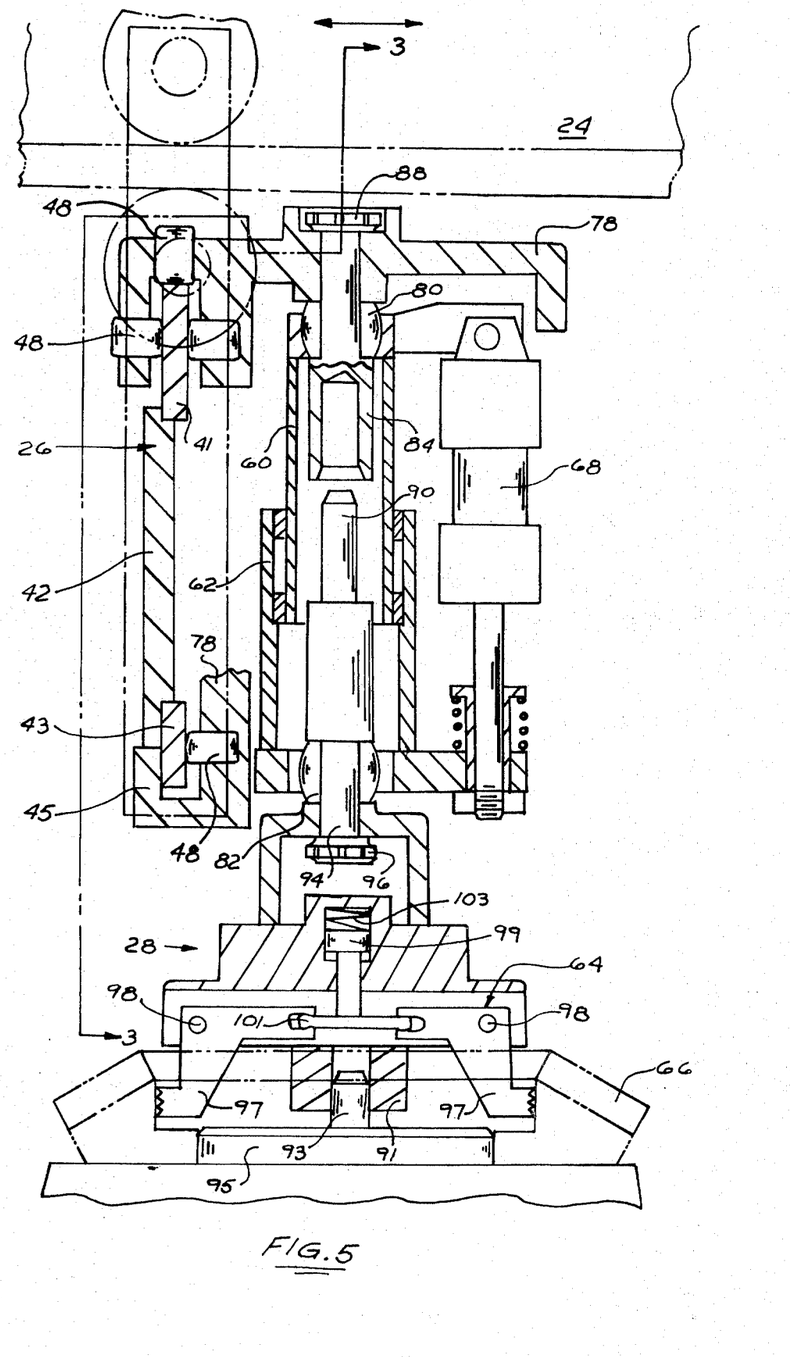
FIG. 5 is a side elevational view, partly in section, of the features shown in FIG. 3, as would be seen on a view line generally perpendicular to the longitudinal axis of the system.

FIGS. 3 – 5 illustrate details of the overhead handling and conveying system utilized in the arrangement shown in FIG. 1.

Basically, the overhead handling and conveying system comprises (1) a fixed overhead rail means 24 which carries all of the load of an object to be conveyed or suspended and (2) a guide track means 30, 30', 30'' which is suspended beneath the overhead rail means to provide for a shifting of the load in directions perpendicular to the main longitudinal axis of the overhead rail means. The shifting of the load is accomplished without adjusting the position of the overhead rail means itself, and yet, the guide track means which effects the shifting of the load can be easily adjusted and does not carry any significant share of the suspended load. This arrangement provides for the suspension and movement of relatively heavy loads without a requirement for costly and complex mechanisms to effect lateral adjustments of such loads.

The overhead rail means 24 may be constructed from an I-beam member or in any other manner to provide for required stability and load-carrying capacity. The overhead rail means 24 is shown as a stright member defining a longitudinal path of travel for a workpiece being carried by the system, but it could be shaped to define an arcuate path if desired. In any case, this specification and its claims will refer to its axis as being generally longitudinal, and this is intended to describe the elongate path of travel defined by the fixed-position overhead rail means 24.

The guide track means 30, 30', 30'' is mounted to the underside of the overhead rail means 24 and in the embodiment shown sections 30' and 30'' are carried so as to be adjustable in directions generally perpendicular to the main longitudinal axis of the overhead rail means. As shown in FIGS. 3 and 4, the sections of guide track means 30' and 30'' are pivotally secured by clamping screw 31 to a block member 32 which is carried by an adjusting screw means 34. The adjusting screw means is secured to mounting brackets 36 connected to a bottom mounting plate of the overhead rail means so as to permit rotation of the adjusting screw means 34 with no axial displacement thereof. Rotation of the adjusting screw means 34 is effected manually by first loosening clamping screw 31 and then by applying a wrench or other tool to its head portion 38. The main body of the adjusting screw means 34 is externally threaded and is received in threaded engagement within an internally threaded bore formed transversely through the block member 32. Thus, rotation of the adjusting screw means 34 causes the block member 32, and its associated guide track means 30' and 30'' to be moved in one direction or the other along the length of the adjusting screw means 34. This causes a shifting of the guide track means in directions generally perpendicular to the main longitudinal axis of the overhead rail means. After adjustment in the manner just described, clamp screw 31 is re-tightened.

FIGS. 2, 2a, 2b, 2c, 2d, and 3 illustrate further details of the adjusting screw mechanism and guide track means, as associated with the type of installation shown in FIG. 1. In such an installation, it is desirable to provide for a range of lateral movements of the guide track means 30' and 30" over each of the gear cutting machines so that workpieces can be deposited at precise positions on the workholder assemblies of the machines in accordance with the size of workpiece being handled. To provide for this feature of adjustment over each machine, the guide track means 30, 30', 30" is formed in a plurality of sections which are pivoted together on vertical pivot axes so that selected sections can be displaced and adjusted by adjusting screw means 34 located over each of the gear cutting machines. As shown in FIGS. 2, 2a, 2b, 2c and 2d, the sections of the guide track means 30, 30', 30" are articulated together so as to provide fixed pivot points (at each end of the track and at stations II, III and V) about which the sections 30' and 30" may be pivoted and over which they may be translated a small distance by reason of the elongated slots. FIG. 2 schematically illustrates, to an exaggerated degree, a range of lateral movements available over the second gear cutting machine at station IV. A similar range of movements would be avialable over the first gear cutting machine at Station I and, in a typical operation, the adjustable ends of the sections 30' and 30" all would be ajusted to the same lateral positions for handling a given size of workpiece between the two gear cutting machines. FIG. 3 illustrates an end elevation view of the adjusting screw means 34 as related to an articulation of sections of the guide track means as they would be assembled immediately above each of the gear cutting machines of FIGS. 1 and 2.

Referring to FIGS. 3 and 5, the carriage frame means 26, which carries the load suspended from the system, is supported and guided on the overhead rail means 24 by wheel elements 39 and 40, the latter contacting upper and lower support surfaces of the overhead rail means 24, while wheel elements 39 contact vertical guide surfaces 23. The carriage frame means 26 may be assembled in any desired form to provide for a suspension of a load from the overhead rail means 24. In the illustrated embodiment, the carriage frame means 26 is assembled from a number of plate elements 41, 42, 43 and 44 which are welded or secured together to form a rigid frame assembly that can be suspended from the overhead rail means 24. Preferably, the carriage frame means includes parallel support surfaces 46 defined by the plate members 41 to provide horizontally disposed support surfaces for a holding means or pickup mechanism 28 suspended within the carriage frame means 26. As shown in FIGS. 3 and 5, wheel elements 48 are carried at various points by the pickup mechanism 28 so that the entire mechanism is supported on and within the carriage frame means 26 for transverse movements (to the left and right in the FIG. 3 view) relative to the main line of travel of the carriage frame means 26 along the overhead rail means 24. The pickup mechanism 28 is laterally guided within the confines of the carriage frame means by straddling engagement of its guide rollers 50 on opposite sides of the guide track means 30, 30', 30" (see FIG. 3). Thus an adjustment of lateral position of the guide track means dictates lateral movement of the pickup mechanism within the carriage frame means 26.

The pickup mechanism 28 is confined within carriage frame means 26 by the wheel elements 48 and gib section 45 such that it can move only laterally and cannot rotate within the carriage frame. Guide rollers 50 have a small amount of clearance with guide track 30, such that this fixed angular positioning of the pickup mechanism can be maintained and still permit freedom of movement along the guide track means when sections 30' and 30" assume a small angle to the line of the overhead rail.

FIG. 5 illustrates details of the pickup mechanism carried by the overhead handling and conveying system for receiving, transferring and depositing workpieces. In its broadest sense, the pickup mechanism 28 constitutes a holding means for holding workpieces as they are being moved and placed, and this mechanism is capable of selectively gripping or releasing a workpiece.

The pickup mechanism includes a support column structure made up of an upper sleeve section 60 and a lower sleeve section 62 which telescope relative to one another so as to provide a support column which can be extended and retracted. FIG. 5 shows the column in its extended condition which allows a gripping mechanism 64 to engage and grip a workpiece 66. Extension and retraction movements of the support column are controlled by a conventional hydraulic piston and cylinder device 68 which includes a piston rod means 70 that is moved downwardly and upwardly by the movement of a piston within the cylinder of the device. The hydraulic device may be double acting so that both directions of movement can be positively controlled. A bearing sleeve member 72 and spring means 74 are interposed between the hydraulic device 68 and a mounting plate 76 of the support column structure so as to dampen shocks imparted to the support column as it moves downwardly and contacts a workpiece. When the support column is retracted from the position shown in FIG. 5, the lower sleeve member 62 is drawn upwardly in telescoping relationship around the fixed position upper sleeve member 60.

A special feature of the pickup mechanism of FIG. 5 is one of providing for slight lateral movements of the entire mechanism away from its center vertical axis. Such movements are required to compensate for slight misalignments of workpieces with the gripping mechanism 64 which must make contact with and engage such workpieces, and also to compensate for slight misalignment of workpieces as they are lowered over receiving and centering means at the several stations. This out of axis movement may be considered a flexing capability for the support column structure of the pickup mechanism. Flexing of the support column is provided by articulating the upper sleeve section 60 to an upper housing structure 78 of the pickup mechanism. The upper housing structure 78 carries the wheel elements 48 for suspending the pickup mechanism from the carriage frame means 26 and does not extend and retract with the remainder of the pickup mechanism. Articulation of the upper sleeve section 60 to the housing 78 is provided by a spherical bearing means 80 so that the upper sleeve section 60, and all structures carried thereby, can flex away from the center axis of the pickup mechanism when the support column of the mechanism is in the extended condition shown in FIG. 5. Additional flexing capability of the lower portion of the pickup mechanism is provided by an articulation of the lower sleeve section 62 to mounting structure associated with the gripping mechanism 64. This articulation is provided by another spherical bearing 82. Thus, the entire support column and its associated structures can move away from the center axis of the pickup mechanism about a pivot point defined by the spherical bearing 80, and the gripping mechanism 64 can separately flex away from the center axis of the remainder of the column by a movement about a pivot axis defined by the lower spherical bearing 82.

A further characteristic of the flexing capability of the pickup mechanism is that it functions only when the support column is in an extended condition (a shown in FIG. 5) for making contact with a workpiece. When the support column is retracted for conveying movements of a workpiece along the overhead handling and conveying system, the pickup mechanism becomes a rigid unit with no flexing of its component parts. This is accomplished by providing a locking means within the support column structure for locking the entire pickup mechanism in its own center axis when the support column is retracted to an upper position for transfer movements. The locking means shown in FIG. 5 comprises a female sleeve member 84 carried as an extension of a mounting shaft 86 which secures the support column structure to the housing 78. The shaft 86 is provided with a threaded end at its upper end for receiving a spanner nut 88 which secures the assembly together. A male member 90 is carried by the extendible and retractable portion of the support column so as to be received within the female sleeve member 84 when the support column is drawn upwardly to its retracted position. The male member 90 is secured to a lower support shaft 92 having a lower extended end 94 for fastening the gripping mechanism 64 to the support column structure. The lower end of the extended portion 94 is threaded to receive a spanner nut 96 which secures the lower end of the assembly together. Thus, when the support column is retracted, and the male member 90 is received within the female sleeve member 84, the entire pickup mechanism is restrained from pivotal movements about its points of articulation at 80 and 82.

Operating in conjunction with the articulating capability of the pickup mechanism are means for piloting a workpiece being lowered by the pickup mechanism into necessary alignment with the workholders at the various stations. Typical of these piloting means are nose piece 93 on gear centering ring 95, and mating engaging surface 91, of body member 65 of the gripping mechanism 64.

FIG. 5 also illustrates certain details of the gripping mechanism 64 used with the pickup mechanism. The gripping mechanism includes three gripping jaws 97 which can be rocked about their respective fixed pivots 98 in body member 65 to bring their gripping surfaces (shown as serrated surfaces) into and out of contact with vertical surfaces of a workpiece 66 so as to retain or release the workpiece relative to the gripping mechanism. The jaws 97 are rocked by the reciprocating action of a piston and rod assembly 99 interconnected to an annular ring 101 which ties all of the jaws together for common movements. The piston part of the assembly 99 is fitted in a chamber so as to be actuatable by hydraulic fluid. Preferably the piston is arranged to be pressed downwardly by a spring means 103 to bring the jaws into gripping engagement with a workpiece, while a releasing of the jaws is effected by controlled admission of hydraulic fluid into a lower part of the chamber beneath the piston (by known hydraulic systems, not shown). This arrangement prevents loss of gripping engagement, and dropping of a workpiece, in the event of a hydraulic failure.

Figure 6:
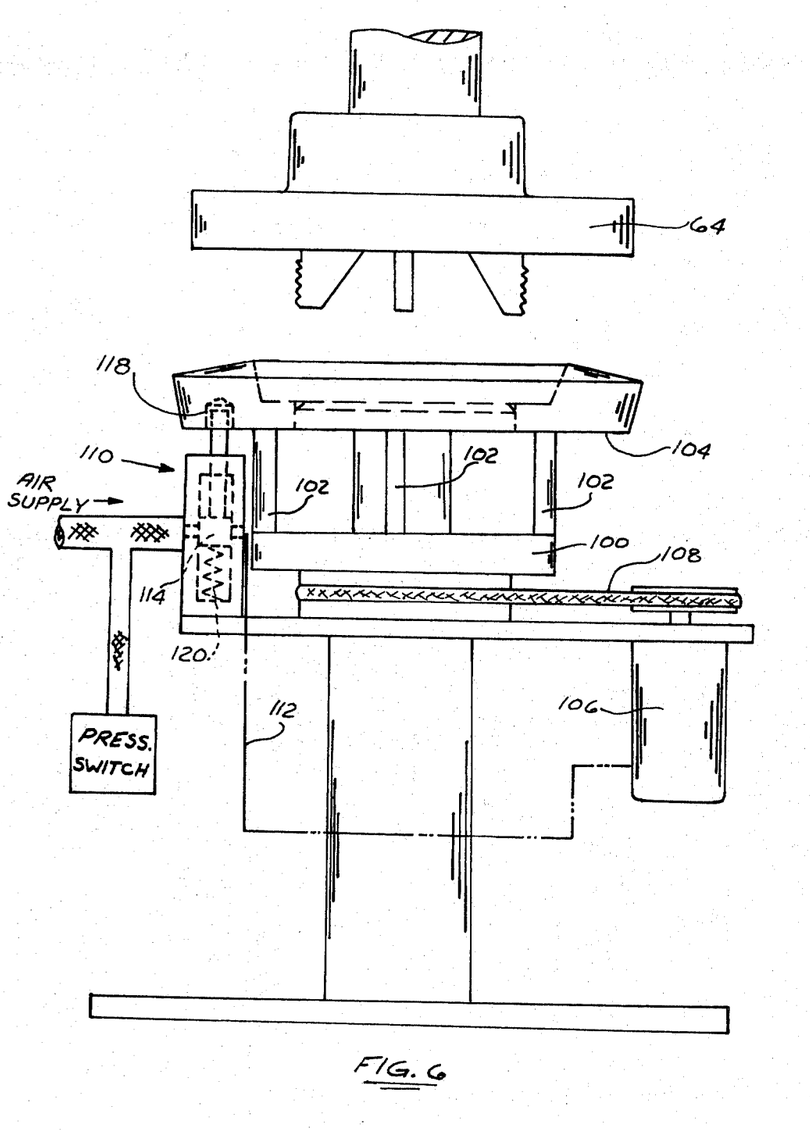
FIG. 6 is a side elevational view of an orientor station used in the handling of workpieces to be transferred to a gear cutting machine.

FIG. 6 illustrates details of the orientor station II which is used with the system shown in FIGS. 1 and 2. The orientor station functions to receive a work blank and to orient the blank in its axis so that an aligning device, such as a keyway or other formation, formed on the bottom side of the workpiece is properly oriented for placement on a torque pin carried by the workholder assembly of the first gear cutting machine at station I. Orientation of work blanks on rougher gear cutting machines is known per se as disclosed, for example, in U. S. Pat. No. 3,468,435. However, the present system provides for a separate orientor station to prepare workpieces for placement on the first gear cutting machine. As shown in the drawing, a workpiece is deposited by the pickup mechanism onto a turntable means 100. The turntable means includes a supporting surface, such as defined by the upper ends of upwardly extending shoes 102, which provides a level and flat surface upon which a lower face 104 of a workpiece can be received. A motor means, which may be an air motor means, 106 is mounted for rotating the turntable means 100 with an endless drive belt 108 driven by the output shaft and a pulley of the motor means. Control means 110 are provided for starting and stopping the motor means, and the rotation of the workpiece carried by the turntable means 100 when a preferred orientation has been reached.

In the illustrated embodiment of FIG. 6, the air motor means is driven by compressed air supplied from a suitable source to the motor means by an air supply circuit schematically shown at 112. The control means comprises a valve device of known construction which includes a spring biased spool valve 114 normally urged in a direction to block the air supply circuit going to the air motor means 106. The spool valve 114 carries an extended portion 116 which is received within a hole 118 formed in the back face 104 of a workpiece once the workpiece has rotated to a preferred orientation. Upward movement of the extended portion 116 into the receiving hole 118 by the urging of a spring means 120 causes the air supply circuit to be blocked, thereby stopping the air motor means 106 and any further rotation of the turntable means 100. However, when the workpiece is misoriented from the position shown in FIG. 6, the extended portion 116 of the spool valve is pressed downwardly by the back face 104 of the workpiece, and the air supply circuit is maintained open until such time as the spool valve pops up to a blocking position by a movement of the extended portion into the receiving hole 118. This provides for an automatic orientation of each workpiece placed on the orientor station II.

Figure 7:
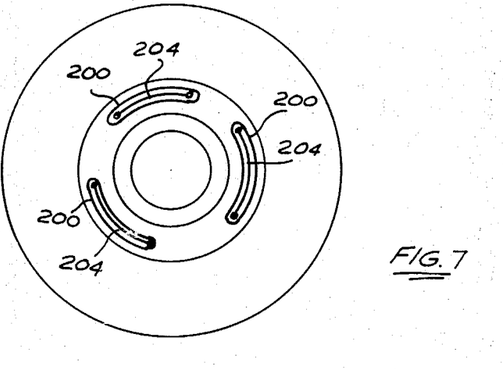
FIG. 7 is a top plan view of a workholder of a gear cutting machine showing air cushion means associated therewith.
Figure 8:
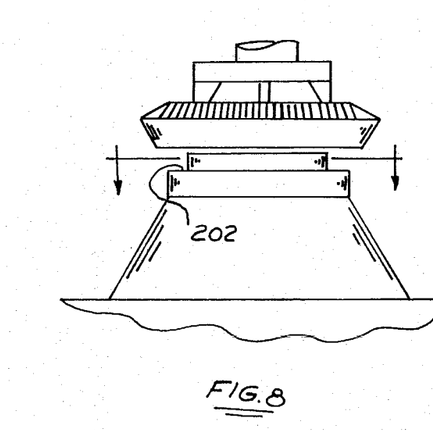
FIG. 8 is an elevational view of the workholder of FIG. 7, showing a workpiece being placed thereon.
Figure 9:
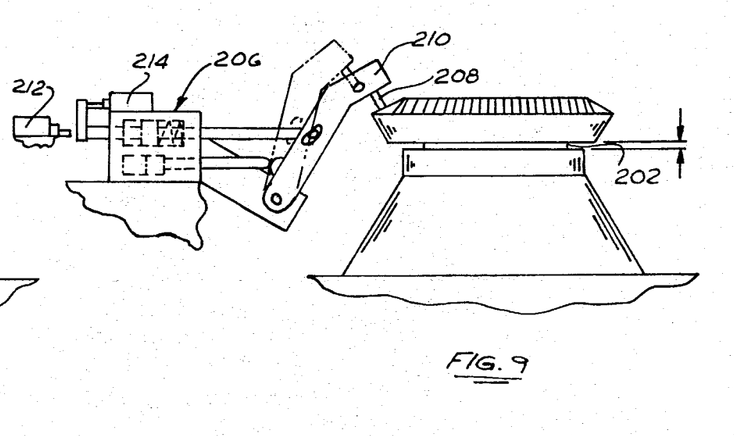
FIG. 9 is an elevational view similar to FIG. 8, showing a stock dividing means used in conjunction with the placement of a workpiece on the workholder of a gear cutting machine.

FIGS. 7 – 9 illustrate an air cushion means and stock dividing means used with the second gear cutting machine at station IV. The air cushion means comprises a number of pad formations 200 formed on an upper workpiece-receiving surface 202 of the workholder assembly portion of a gear cutting machine. Each air cushion pad 200 is provided with an air channel groove 204 which distributes air from a suitable supply circuit (not shown) to the entire length of the pad. Sufficient air is supplied to maintain a workpiece in a slightly raised position above the surface 202 so that the workpiece can be rotated by a very slight amount for precisely positioning its tooth formations for final cutting. Rotation of the workpiece is carried out by a stock dividing means 206 which includes a feeler member 208 for moving downwardly into a tooth slot to cause a repositioning of the workpiece in accordance with a final limit position of the feeler member 208 at the bottom of the slot. Stock dividing means of this type are known and do not form a separate part of the present invention, however, the stock dividing means 206 of FIG. 9 is arranged to control the supply of air to the air cushion means 200 in accordance with extreme limits of movement of a lever member 210. Phantom lines illustrate an extreme position of the lever 210 and its associated feeler member 208 for actuating a switch 212 which opens an air supply circuit to the air cushion means. This permits rotation of a workpiece as the feeler member 208 is lowered into engagement with a tooth slot on the workpiece. When the lever 210 reaches its lowermost position, shown in full lines in FIG. 9, a second limit switch 214 is actuated to close a valve in the air supply circuit, thereby preventing the workpiece from rotating on the workholder assembly.

Although the invention has been described with reference to a specific embodiment, it will be appreciated that the principles of this invention can be used in numerous applications. Equivalent substitutions and uses, and obvious departures from what has been disclosed are intended to be included within the scope of protection being sought herein.

What is claimed is:

1. A system for handling and conveying relatively large workpieces or other objects, comprising
   an overhead rail means which defines a generally longitudinal path of travel for a workpiece being handled,
   a guide track means suspended from said overhead rail means for adjusting the longitudinal path of travel of a workpiece in a direction which is generally perpendicular to the main longitudinal axis of said overhead rail means,
   adjusting means associated with said guide track means for shifting said guide track means perpendicularly to the main axis of said overhead rail means,
   a carriage frame means suspended from said overhead rail means for carrying the load of a workpiece, said carriage frame means being suspended for movement along the longitudinal axis of the overhead rail means, and said carriage frame means having a support surface for receiving the weight of the load to be carried,
   holding means for retaining a workpiece while it is being moved or handled, said holding means being supported by said support surface of said carriage frame means so as to be movable transversely of the longitudinal axis of said overhead rail means by movements of said carriage frame means, and
   means for engaging said holding means with said guide track means so that the holding means is guided to the adjusted position of said guide track means as said carriage frame means is moved along said overhead rail means.

2. The system of claim 1 wherein said guide track means comprises a plurality of sections which are articulated together to form a continuous guide track having individual sections that can be adjusted generally perpendicularly to the longitudinal axis of said overhead rail means by said adjusting means.

3. The system of claim 2 wherein said adjusting means comprises a screw means which is received in threaded engagement with a portion of said guide track means so as to be rotatable relative to the guide track means to effect adjustment of the guide track means relative to the overhead rail means, said screw means being carried by said overhead rail means so as to be rotatable but not axially movable relative to the overhead rail means.

4. The system of claim 1 wherein said overhead rail means comprises a fixed elongate structure having continuous support surfaces along each side thereof for receiving and supporting wheel elements carried by said carriage frame means so that said carriage frame means can be rolled along the overhead rail means.

5. The system of claim 1 wherein said carriage frame means includes parallel support surfaces positioned in horizontal planes and extending perpendicularly to the longitudinal axis of said overhead rail means for receiving and supporting wheel elements carried by said holding means so that said holding means is suspended within said carriage frame means for transverse movements relative to the longitudinal axis of said overhead rail means.

6. The system of claim 1 wherein said holding means comprises a pickup head mechanism which can be selectively actuated to grip or release a workpiece.

7. The system of claim 6 wherein said pickup head mechanism includes means for being extended and retracted in a generally vertical axis so as to extend down to a level at which a workpiece is to be received or deposited and to retract up to a level at which the workpiece is to be conveyed to another location.

8. The system of claim 7 wherein said pickup head mechanism includes upper and lower sleeve sections which telescope relative to one another to provide a support column which can be extended and retracted, said upper sleeve section being operatively connected to an upper housing structure which is supported by said carriage frame means, and said lower sleeve section being operatively connected to a gripping mechanism which contacts a workpiece.

9. The system of claim 8 wherein said upper and lower sleeve sections are articulated to said housing structure and said gripping mechanism respectively so as to provide a flexing capability for said support column at its points of articulation.

10. The system of claim 9 wherein said pickup head mechanism includes a locking means for locking said support column and preventing said flexing capability when the upper and lower sleeve sections are in their retracted relative positions for conveying a workpiece.

* * * * *

UNITED STATES PATENT OFFICE
CERTIFICATE OF CORRECTION

Patent No. 3,766,861                    Dated October 23, 1973

Inventor(s) John L. Ash II

It is certified that error appears in the above-identified patent and that said Letters Patent are hereby corrected as shown below:

Column 1, line 23, change "rought" to ---rough---.
Column 3, line 64, change "heavey" to ---heavy---.
Column 4, line 24, after "The" add ---overhead rail means 24 is designed and constructed to carry the---.
Column 5, line 21, change "rought-cut" to ---rough-cut---;
         line 32, change "cuttin" to ---cutting---.
Column 6, line 34, change "stright" to ---straight---.
Column 7, line 30, change "ajusted" to ---adjusted---.

Signed and sealed this 5th day of March 1974.

(SEAL)
Attest:

EDWARD M. FLETCHER, JR.                C. MARSHALL DANN
Attesting Officer                      Commissioner of Patents